(12) United States Patent
Miyazaki et al.

(10) Patent No.: US 9,500,822 B2
(45) Date of Patent: Nov. 22, 2016

(54) OPTICAL-ELECTRICAL HYBRID MODULE

(71) Applicant: SONY CORPORATION, Tokyo (JP)

(72) Inventors: Hirohito Miyazaki, Kanagawa (JP);
Tsuyoshi Ogawa, Kanagawa (JP);
Kazuyoshi Yamada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/591,197

(22) Filed: Jan. 7, 2015

(65) Prior Publication Data
US 2015/0160421 A1 Jun. 11, 2015

Related U.S. Application Data

(63) Continuation of application No. 13/926,346, filed on Jun. 25, 2013, now Pat. No. 8,950,950.

(30) Foreign Application Priority Data

Aug. 9, 2012 (JP) .................. 2012-177010

(51) Int. Cl.
*G02B 6/43* (2006.01)
*G02B 6/42* (2006.01)
*H04B 10/25* (2013.01)

(52) U.S. Cl.
CPC ............. *G02B 6/4262* (2013.01); *G02B 6/426* (2013.01); *G02B 6/4257* (2013.01); *G02B 6/43* (2013.01); *H04B 10/25* (2013.01); *G02B 6/428* (2013.01)

(58) Field of Classification Search
CPC ............. G02B 6/3897; G02B 6/4256–6/4259; G02B 6/4262
See application file for complete search history.

(56) References Cited

U.S. PATENT DOCUMENTS

| 2005/0135770 | A1 | 6/2005 | McClellan et al. |
| 2006/0110110 | A1* | 5/2006 | Yi ........................ G02B 6/421 385/93 |
| 2013/0336617 | A1* | 12/2013 | Otte .................... G02B 6/4214 385/77 |

* cited by examiner

*Primary Examiner* — Omar R Rojas
(74) *Attorney, Agent, or Firm* — Chip Law Group

(57) ABSTRACT

There is provided an optical-electrical hybrid module including a substrate on which a plurality of optical communication modules are arranged, the plurality of optical communication modules transmitting or receiving an optical signal through an optical fiber cable and performing conversion between the optical signal and an electrical signal. A shield case covering the optical communication modules includes a surface inclined in a direction away from a position in which the optical fiber cable is mounted to each optical communication module.

21 Claims, 6 Drawing Sheets

OPTICAL-ELECTRICAL HYBRID MODULE

CROSS-REFERENCE TO RELATED APPLICATIONS

This application is a continuation application of U.S. patent application Ser. No. 13/926,346 filed on Jun. 25, 2013, which claims priority benefit of Japanese Patent Application JP 2012-177010 filed in the Japan Patent Office on Aug. 9, 2012. Each of the above referenced applications is hereby incorporated herein by reference in its entirety.

BACKGROUND

The present technology relates to an optical-electrical hybrid module, and more particularly, to an optical-electrical hybrid module intended to realize miniaturization and high density while suppressing loss in a device in which an optical fiber is used.

In recent years, in various electronic devices, as an amount of information to be dealt with has been increasing, so has use of an optical fiber as an information transmission channel.

In this case, for example, one end of the optical fiber is connected to an information processing device via a light transmission module. This light transmission module converts an electrical signal output from the information processing device into an optical signal and emits the optical signal to the optical fiber. Further, a light reception module is connected to the other end of this optical fiber. This light reception module converts the optical signal propagating through the optical fiber into an electrical signal.

Further, the increasing amount of information to be dealt with has necessitated higher speed information communication.

For example, it is necessary to install a light transmission module or a light reception module as a high-density array for miniaturization in order to achieve high-speed information communication in a super computer, a data center, or the like.

Further, the number of parts tends to increase due to the high-density array, and an amount of heat generated during operation of an electronic device increases correspondingly. Therefore, it is important to obtain sufficient shield effects and take sufficient heat radiation measures.

Technology intended to sufficiently obtain both a shield effect and a cooling effect in a shield structure for a chip part has been proposed (e.g., see Japanese Patent Laid-Open No. 2004-71658).

SUMMARY

However, when a light transmission module or a light reception module is mounted at high density, it is necessary to extend an optical fiber in a desired direction while avoiding adjacent modules. Therefore, when the light transmission module or the light reception module is mounted at high density, it is necessary to sharply bend the optical fiber, and a loss in the optical fiber occurs at sharp bends.

When a bend radius of the optical fiber increases and the optical fiber is gently bent, the loss does not occur. However, since a distance between the modules increases by doing so, it is difficult for the modules to be a high-density array and it is detrimental to miniaturization.

The present technology has been made in view of such circumstances and is intended to realize miniaturization and high density while suppressing loss in a device in which an optical fiber is used.

According to an embodiment of the present disclosure, there is provided an optical-electrical hybrid module including a substrate on which a plurality of optical communication modules are arranged, the plurality of optical communication modules transmitting or receiving an optical signal through an optical fiber cable and performing conversion between the optical signal and an electrical signal. A shield case covering the optical communication modules includes a surface inclined in a direction away from a position in which the optical fiber cable is mounted to each optical communication module.

A top surface of the shield case may include a horizontal surface having a first height determined according to a thickness of a part having a greatest thickness among parts mounted on wiring substrates of the optical communication modules, and a horizontal surface having a second height determined according to a thickness of a part having a smallest thickness among the parts mounted on the wiring substrates of the optical communication modules.

In the top surface of the shield case, the horizontal surface having the second height may extend by 2 mm to 15 mm long in a direction in which the optical fiber cable extends.

A difference between the first height and the second height may be 0.2 mm or more.

A part having a greatest thickness among parts mounted on the wiring substrates of the optical communication modules may be a silicon interposer.

The shield case may be formed of a metal material.

In one aspect of the present technology, an optical signal is transmitted or received through an optical fiber cable, a plurality of optical communication modules that perform conversion between the optical signal and an electrical signal are arranged, and a shield case covering the optical communication modules includes a surface inclined in a direction away from a position in which the optical fiber cable is mounted to the optical communication module.

According to embodiments of the present technology, it is possible to realize miniaturization and high density while suppressing loss in an apparatus in which an optical fiber is used.

DETAILED DESCRIPTION OF THE EMBODIMENT(S)

Figure 1:
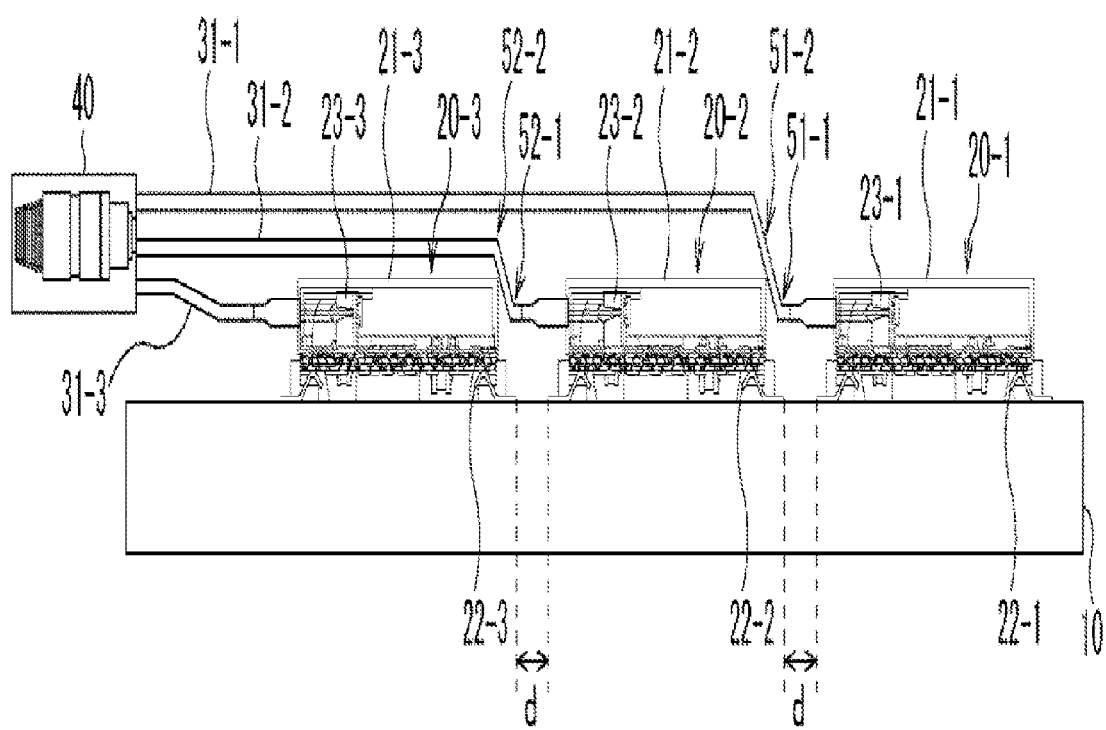
FIG. 1 is a diagram illustrating an example configuration of an optical-electrical hybrid module in which optical communication modules of the related art are installed as a high-density array.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In recent years, in various electronic devices, use of an optical fiber as an information transmission channel has been increasing along with the amount of information to be dealt with.

In this case, for example, one end of the optical fiber is connected to an information processing device via a light transmission module. This light transmission module converts an electrical signal output from the information processing device into an optical signal and emits the optical signal to the optical fiber. Further, a light reception module is connected to the other end of this optical fiber. This light reception module converts the optical signal propagating through the optical cable into an electrical signal.

The light transmission module and the light reception module are collectively referred to as an optical communication module. Usually, a plurality of optical communication modules are arranged on a substrate in which electrical wiring patterns or the like are provided in advance, configured as an optical-electrical hybrid module, and are incorporated into various computers or the like.

Further, a surface of the optical communication module is covered by a shield case to protect the optical communication module from heat generated during operation of a device such as a computer.

Further, the increasing amount of information to be dealt with has necessitated higher speed information communication.

For example, it is necessary to install optical communication modules as a high-density array and miniaturize an optical-electrical hybrid module in order to achieve high-speed information communication in a super computer, a data center or the like.

However, when the optical communication modules are installed at high density, it is necessary to extend an optical fiber in a desired direction while avoiding the adjacent modules. Therefore, when the optical communication modules are mounted at high density, it is necessary to sharply bend the optical fiber, and optical loss occurs at sharp bends.

FIG. 1 illustrates an example configuration of an optical-electrical hybrid module 1 in which optical communication modules of the related art are installed as a high-density array. In the example of FIG. 1, an optical communication module 20-1 to an optical communication module 20-3 are installed on a substrate 10.

In FIG. 1, a distance between the adjacent optical communication modules is d. In other words, the optical communication module 20-1 and the optical communication module 20-2 are installed the distance d apart, and the optical communication module 20-2 and the optical communication module 20-3 are also installed the distance d apart.

Further, the optical communication module 20-1 is configured in such a manner that a printed circuit substrate 22-1, a silicon interposer 23-1 and the like are covered with a shield case 21-1. The optical communication module 20-2 and the optical communication module 20-3 are also configured like the optical communication module 20-1.

Further, FIG. 1 is drawn to show the inside of the shield case 21-1 for convenience. For example, the sides or the like of the shield case 21-1 are not drawn.

An optical fiber cable 31-1 to an optical fiber cable 31-3 connected to the optical communication module 20-1 to the optical communication module 20-3, respectively, extend toward a connector 40 arranged on the left side of FIG. 1.

For example, the optical fiber cable 31-1 extends to the left in FIG. 1 while avoiding the optical communication module 20-2 and the optical communication module 20-3. Therefore, the optical fiber cable 31-1 is sharply bent upward at a position indicated by an arrow 51-1 and to the left at a position indicated by an arrow 51-2 in FIG. 1.

Further, for example, the optical fiber cable 31-2 extends to the left in FIG. 1 while avoiding the optical communication module 20-3. Therefore, the optical fiber cable 31-2 is sharply bent upward at a position indicated by an arrow 52-1 and to the left at a position indicated by an arrow 52-2 in FIG. 1.

When the optical fiber cable is sharply bent in this way, optical loss occurs at the sharp bends.

Figure 2:
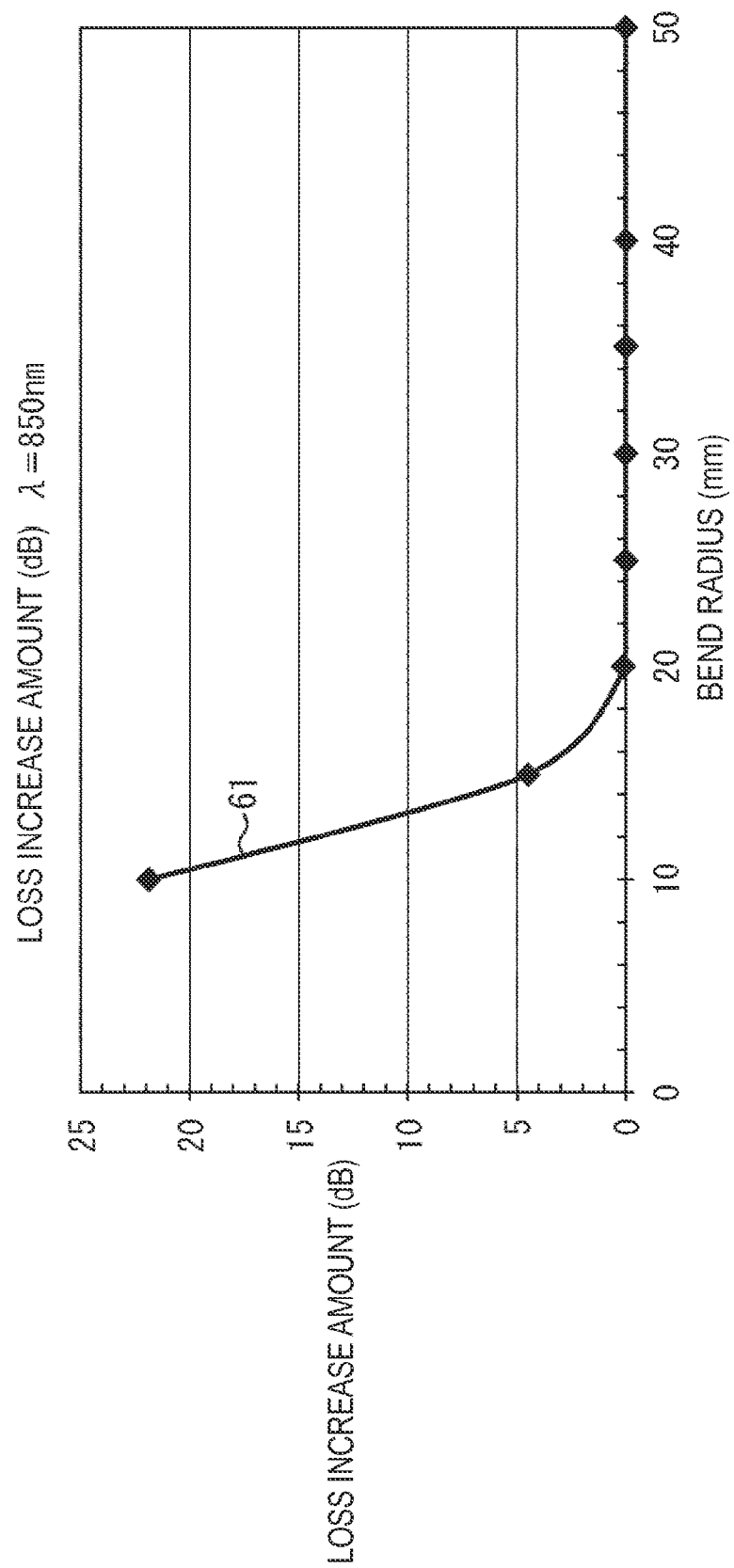
FIG. 2 is a graph illustrating a relationship between a bend radius and optical loss of an optical fiber.

FIG. 2 is a graph illustrating a relationship between a bend radius and optical loss in the optical fiber. In FIG. 2, a horizontal axis indicates the bend radius of the optical fiber, and a vertical axis indicates optical loss. The relationship between the bend radius and the optical loss is shown by a line 61.

Further, here, the relationship between the bend radius and the optical loss in the optical fiber at a wavelength $\lambda=850$ nm of light incident on the optical fiber is shown.

The line 61 sharply rises from a position in which the bend radius is 20 mm or less, as shown in FIG. 2. In other words, it is desirable to design the optical-electrical hybrid module so that the bend radius of the optical fiber cable is equal to or more than 20 mm in order to suppress the optical loss in the optical fiber.

However, the optical communication module is usually configured as an extremely small part having a size of 1 cm or less.

Figure 3:
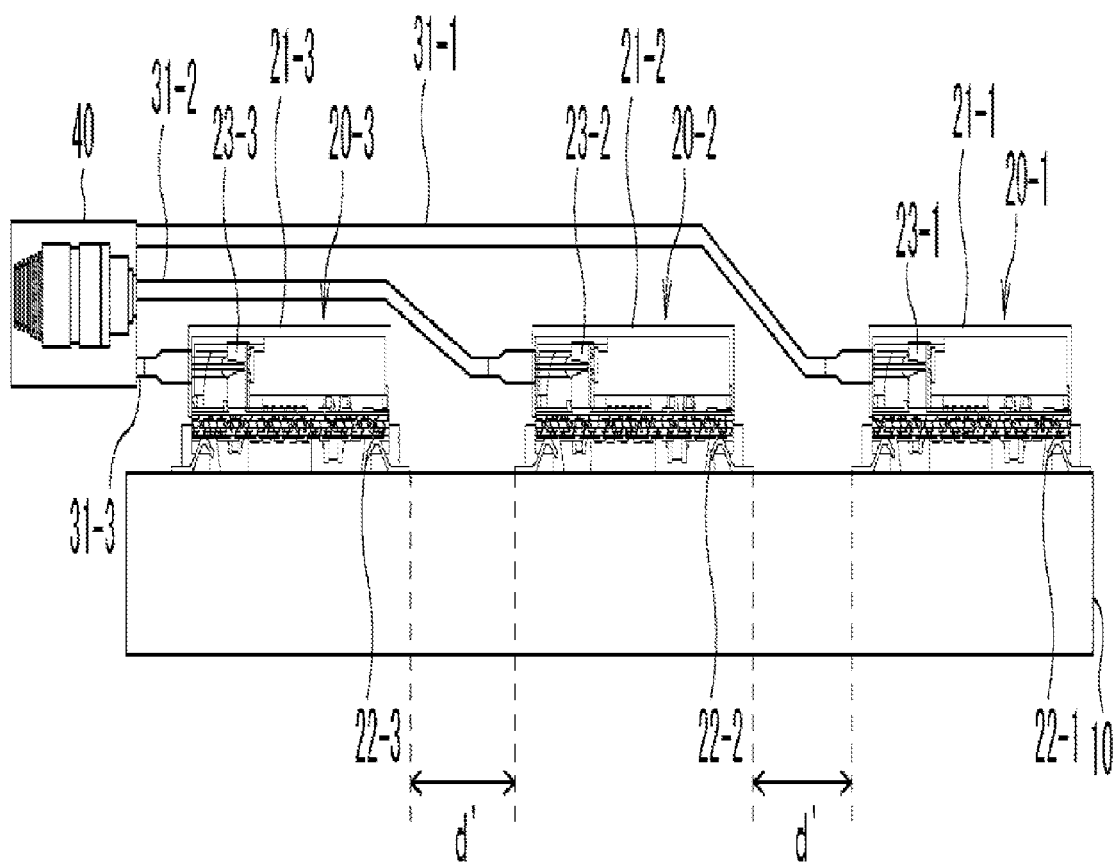
FIG. 3 is a diagram illustrating an example of the optical communication modules shown in FIG. 1 installed on a substrate in consideration of a bend radius.

FIG. 3 is a diagram illustrating an example in which the optical communication module 20-1 to the optical communication module 20-3 shown in FIG. 1 are installed on the substrate 10 so that the bend radius of the optical fiber cable is 20 mm or more.

In the case of FIG. 3, there is no portion in which the optical fiber cable 31-1 and the optical fiber cable 31-2 are sharply bent, unlike the case of FIG. 1. However, in the case of FIG. 3, the distance between the adjacent optical communication modules is greater than that in the case of FIG. 1.

In other words, in the case of FIG. 3, the distance between the adjacent optical communication modules is d', which is greater than d. In other words, the optical communication module 20-1 and the optical communication module 20-2 are installed the distance d' apart, and the optical communication module 20-2 and the optical communication module 20-3 are installed the distance d' apart.

When the adjacent optical communication modules are arranged a large distance apart as in FIG. 3, the optical loss in the optical fiber can be suppressed, but it is difficult to install, at high density, the optical communication modules configured as extremely small parts. In other words, in the related art, it is difficult to install the optical communication modules at high density while suppressing the optical loss in the optical fiber.

Therefore, the present technology is intended to install the optical communication modules at high density while suppressing the optical loss in the optical fiber.

Figure 4:
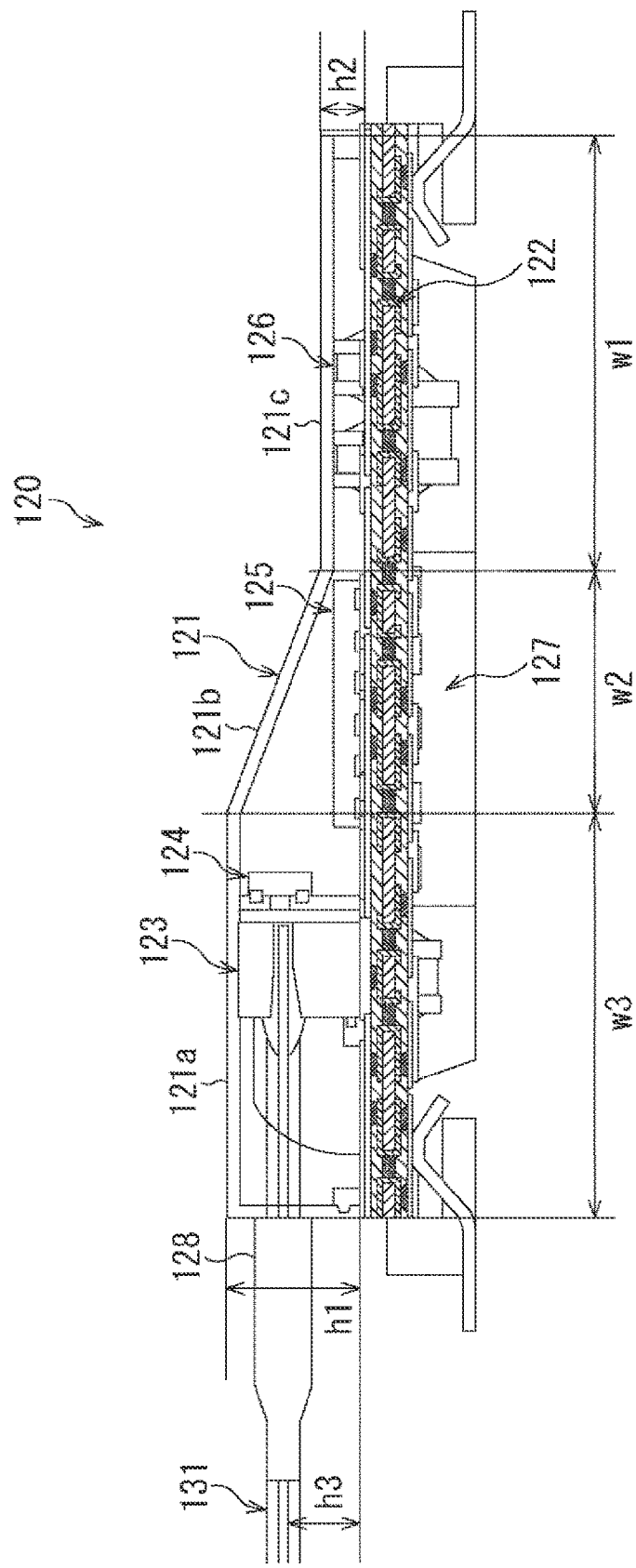
FIG. 4 is a diagram illustrating an example configuration of an optical communication module according to an embodiment of the present technology.

FIG. 4 is a diagram illustrating an example configuration of an optical communication module according to an embodiment of the present technology.

A printed wiring substrate 122 is provided in an optical communication module 120 shown in FIG. 4. The printed wiring substrate 122 is a substrate in which electrical wiring patterns or the like have been printed in advance, and various parts are mounted on and beneath the printed wiring substrate 122 in FIG. 4. A silicon interposer 123, a LDD/TIA 125, and a chip part 126 are mounted on the printed wiring substrate 122. Further, a VCSEL/PD 124 is attached to the silicon interposer 123.

The VCSEL (Vertical Cavity Surface Emitting LASER)/PD 124 is an optical element that irradiates an optical fiber cable 131 with a laser beam and converts an incident laser beam into an electrical signal. The LDD (Laser Diode Driver)/TIA (Trans Impedance Amplifier) 125 functions as a driver that drives the VCSEL/PD 124 or an IC for amplifying a weak signal.

Further, in the optical communication module 120 shown in FIG. 4, a shield case 121 is provided to cover various parts mounted on the printed wiring substrate 122. It is preferable for the shield case 121 to be formed of a metal. Further, FIG. 4 is drawn to show the inside of the shield case 121 for convenience. For example, the sides or the like of the shield case 121 are not drawn. A socket 128 is provided in a left end in FIG. 4 of the shield case 121, and the optical fiber cable 131 extends at the left side in FIG. 4 via the socket 128.

In the example of FIG. 4, an area configured as a horizontal surface at a height h1 from the printed wiring substrate 122, an area configured as a horizontal surface at a height h2 from the printed wiring substrate 122, and an area inclined from the height h1 to the height h2 are included in a top surface of the shield case 121 (an upper surface in FIG. 4).

In other words, the top surface of the shield case 121 is configured as the horizontal surface at the height h1 from the printed wiring substrate 122 in an area 121a corresponding to a length w3 in a horizontal direction in FIG. 4 from the socket 128. Further, the top surface of the shield case 121 is configured as a surface inclined from the height h1 to the height h2 in an area 121b corresponding to a length w2 on the right side in FIG. 4 of the above-described area 121a. Furthermore, the top surface of the shield case 121 is configured as a horizontal surface at the height h2 from the printed wiring substrate 122 in an area 121c corresponding to a length w1 on the right side in FIG. 4 of the above-described area 121b.

Here, the height h1 is a height determined to correspond to a thickness of the silicon interposer 123, which is a part having a greatest thickness in a vertical direction in FIG. 4 on the printed wiring substrate 122. The height h1 is usually approximately 0.8 mm to 0.2 mm.

Further, the height h2 is a height determined to correspond to a thickness of the chip part 126, which is a part having a smallest thickness in the vertical direction in FIG. 4 on the printed wiring substrate 122. The height h2 is usually approximately 0.2 mm to 0.6 mm.

Further, the height h3 from the printed wiring substrate 122 to the optical fiber cable 131 is a height determined to correspond to an arrangement position or a shape of the socket 128.

The top surface of the shield case of the optical communication module of the related art is configured as a horizontal surface at the height h1 from the printed wiring substrate 122 over the entire printed wiring substrate 122. In other words, the top surface of the shield case of the related art is configured as a horizontal surface at a uniform height corresponding to a height of the part having a greatest thickness in the vertical direction in FIG. 4 on the printed wiring substrate 122.

In contrast, the top surface of the shield case of the optical communication module according to the embodiment of the present technology has the surface inclined from the height (e.g., the height h1) corresponding to the height of the part having the greatest vertical thickness in FIG. 4 to a lower height (e.g., the height h2) on the printed wiring substrate 122.

Here, a distance between the adjacent optical communication modules is d and a bend radius of the optical fiber cable is r. Using the height h1, the height h3 and the bend radius r, the distance d can be derived using Equation (1).

$$d = (r^2 - (r - (h1 - h3))^2)^{1/2} \qquad (1)$$

For example, if (h1−h3)=1 mm, the distance d is 6.2 mm from Equation (1) when the horizontal top surface at the height h1 from the printed wiring substrate 122 over the entire printed wiring substrate 122 is provided, as in the shield case of the optical communication module of the related art. In other words, in a scheme of the related art, it was necessary to perform an arrangement with a distance between adjacent optical communication modules being equal to or more than 6.2 mm.

In contrast, when the optical communication module according to the embodiment of the present technology is used as shown in FIG. 4, if (w1+w2) is 6.2 mm or more, the distance d can be approximately 0. When an optical communication module having a general size is configured, it is desirable for w1 to be 2 to 15 mm and (h1−h2) to be 0.2 mm or more.

Figure 5:
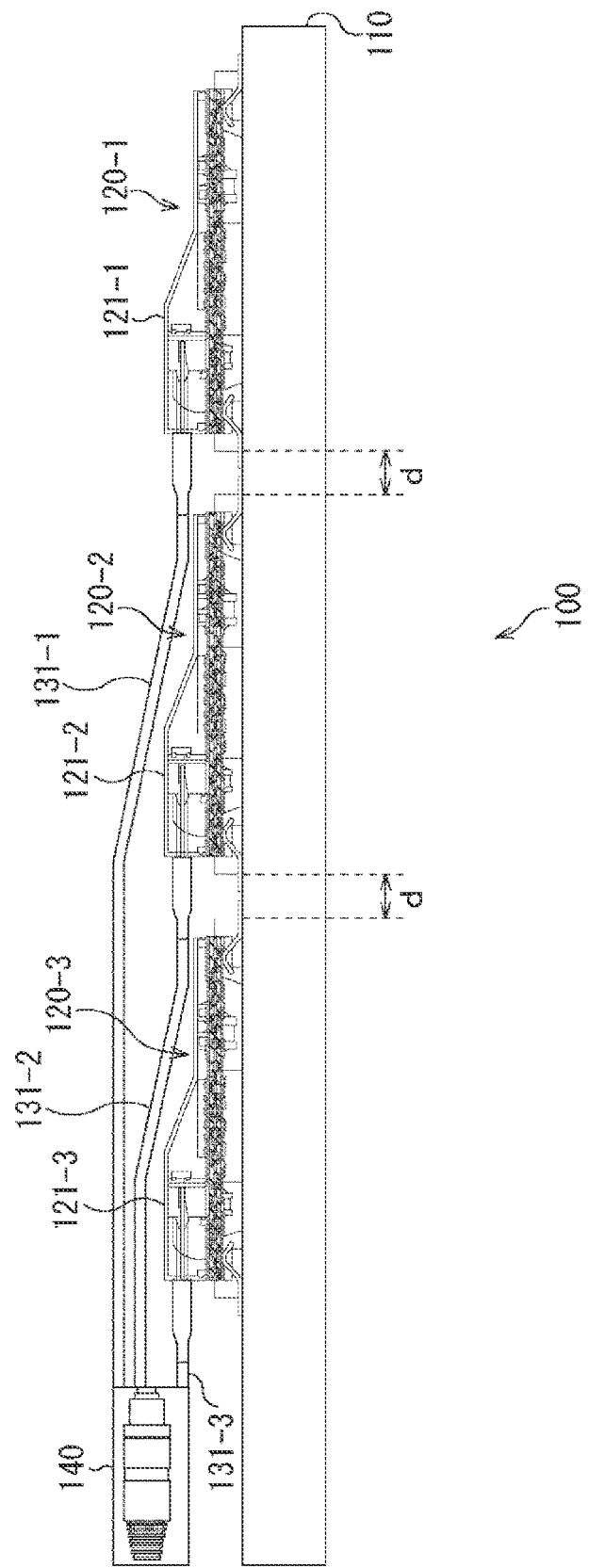
FIG. 5 illustrates an example configuration of an optical-electrical hybrid module in which optical communication modules according to the embodiment of the present technology are installed as a high-density array.

FIG. 5 illustrates an example configuration of an optical-electrical hybrid module to which the present technology has been applied, which is an optical-electrical hybrid module 100 in which optical communication modules according to the embodiment of the present technology are installed as a high-density array. In the example of the FIG. 5, an optical communication module 120-1 to an optical communication module 120-3 according to the embodiment of the present technology are installed on a substrate 110.

An optical fiber cable 131-1 to an optical fiber cable 131-3, connected to the optical communication module 120-1 to the optical communication module 120-3, respectively, extend toward a connector 140 arranged on the left side in FIG. 5.

For example, the optical fiber cable 131-1 extends to the left in FIG. 5 while avoiding the optical communication module 120-2 and the optical communication module 120-3. However, in the example of FIG. 5, there is no portion where the optical fiber cable 131-1 is sharply bent, unlike the case described above with reference to FIG. 1. Further, the optical fiber cable 131-2 extends to the left in FIG. 5 while avoiding the optical communication module 120-2 and the optical communication module 120-3. However, in the example of FIG. 5, there is no portion where the optical fiber cable 132-1 is sharply bent, unlike the case described above with reference to FIG. 1.

Therefore, according to the embodiment of the present technology, it is possible to suppress optical loss in the optical fiber.

Further, in FIG. 5, a distance between the adjacent optical communication modules is d. In other words, the optical communication module 120-1 and the optical communication module 120-2 are installed the distance d apart, and the optical communication module 120-2 and the optical communication module 120-3 are also installed the distance d apart. In other words, it is unnecessary for the distance between the adjacent optical communication modules to be d', which is greater than d, unlike the case of FIG. 3.

Therefore, according to the embodiment of the present technology, it is possible to install the optical communication modules at high density.

Figure 6:
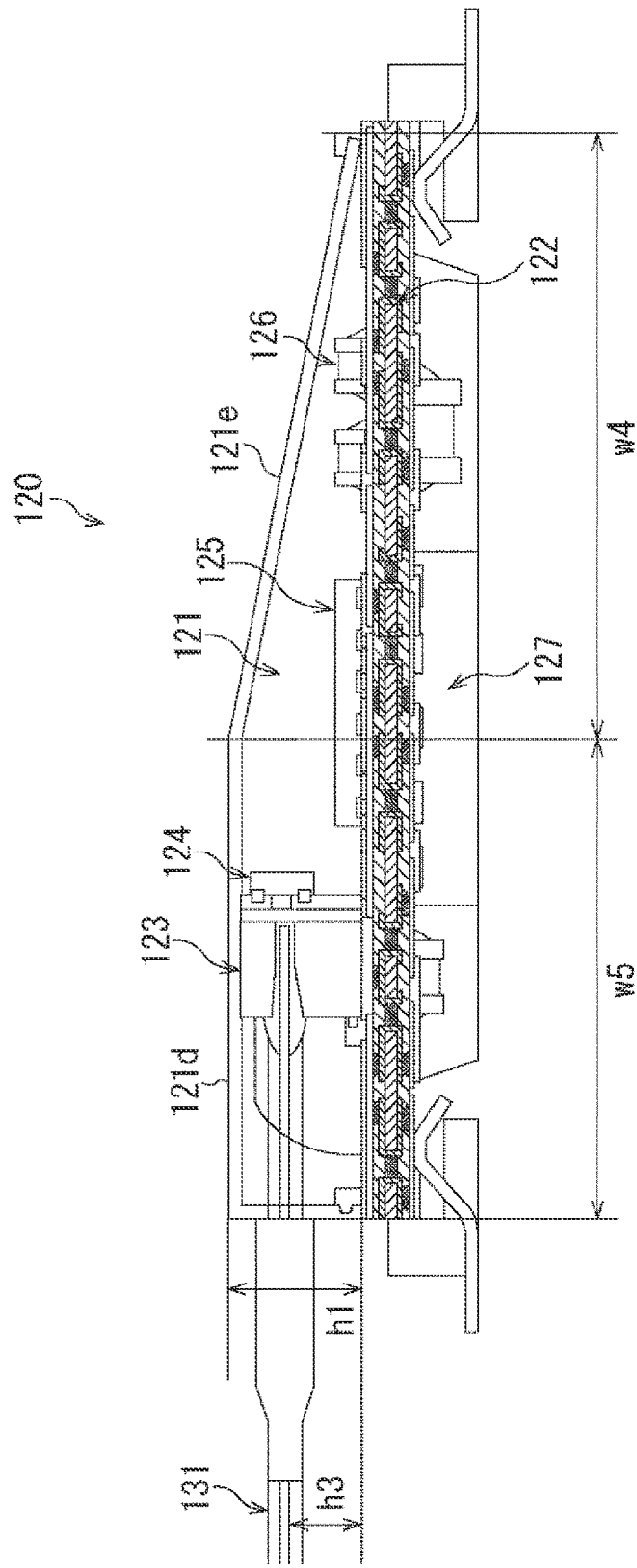
FIG. 6 is a diagram illustrating an example configuration of an optical communication module according to another embodiment of the present technology.

FIG. 6 is a diagram illustrating another configuration example of an optical communication module according to an embodiment of the present technology.

In an optical communication module 120 shown in FIG. 6, a printed wiring substrate 122 is provided, as in the case of FIG. 4. Further, as in the case of FIG. 4, a silicon interposer 123, an LDD/TIA 125, and a chip part 126 are mounted on the printed wiring substrate 122. Further, a VCSEL/PD 124 is attached to the silicon interposer 123.

The optical communication module 120 shown in FIG. 6 differs from that of FIG. 4 in a configuration of the shield case 121. Further, FIG. 6 is drawn to show the inside of the shield case 121 for convenience. For example, the sides or the like of the shield case 121 are not drawn.

In the example of FIG. 6, an area configured as a horizontal surface at a height h1 from the printed wiring substrate 122, and an area inclined from the height h1 to a surface of the printed wiring substrate 122, are included in a top surface of the shield case 121 (a top surface in FIG. 6).

In other words, the top surface of the shield case 121 is configured as a horizontal surface at the height h1 from the printed wiring substrate 122 in an area 121*d* corresponding to a length w5 in a horizontal direction in FIG. 6 from a socket 128. Further, the top surface of the shield case 121 is configured as a surface inclined from the height h1 to the surface of the printed wiring substrate 122 in an area 121*e* corresponding to a length w4 on the right side in FIG. 6 of the above-described area 121*d*.

In the case of FIG. 6, for example, the horizontal surface corresponding to the area 121*c* in the configuration of FIG. 4 is not included.

If the optical communication module 120 having the configuration shown in FIG. 6 is used, it is not necessary to sharply bend the optical fiber cable 131 even when the distance between the optical communication modules 120 is small. Therefore, even when the configuration of FIG. 6 is applied, according to the embodiment of the present technology, optical loss in the optical fiber can be suppressed and the optical communication modules can be installed at high density.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An optical-electrical hybrid module including:
a substrate on which a plurality of optical communication modules are arranged, the plurality of optical communication modules transmitting or receiving an optical signal through an optical fiber cable and performing conversion between the optical signal and an electrical signal,
wherein a shield case covering the optical communication modules includes a surface inclined in a direction away from a position in which the optical fiber cable is mounted to each optical communication module.

(2) The optical-electrical hybrid module according to (1), wherein a top surface of the shield case includes a horizontal surface having a first height determined according to a thickness of a part having a greatest thickness among parts mounted on wiring substrates of the optical communication modules, and a horizontal surface having a second height determined according to a thickness of a part having a smallest thickness among the parts mounted on the wiring substrates of the optical communication modules.

(3) The optical-electrical hybrid module according to (2), wherein, in the top surface of the shield case, the horizontal surface having the second height extends by 2 mm to 15 mm long in a direction in which the optical fiber cable extends.

(4) The optical-electrical hybrid module according to (2), wherein a difference between the first height and the second height is 0.2 mm or more.

(5) The optical-electrical hybrid module according to (2), wherein the part having the greatest thickness among the parts mounted on the wiring substrates of the optical communication modules is a silicon interposer.

(6) The optical-electrical hybrid module according to any one of (1) to (5), wherein the shield case is formed of a metal material.

What is claimed is:

1. An optical-electrical hybrid module comprising:
a substrate on which a plurality of optical communication modules are arranged, the plurality of optical communication modules transmitting or receiving an optical signal through an optical fiber cable and performing conversion between the optical signal and an electrical signal; and
a shield case covering each of the plurality of optical communication modules, wherein a top surface of the shield case comprises:
a first horizontal surface having a first height from wiring substrates of the plurality of optical communication modules;
a second horizontal surface having a second height from the wiring substrates of the plurality of optical communication modules, wherein the second height is different from the first height; and
an inclined surface inclined in a direction away from a position in which the optical fiber cable is mounted to each of the plurality of optical communication module,
wherein a portion of the optical fiber mounted to one of the plurality of optical communication modules extends over the shield case of at least another of the plurality of optical communication modules, and
wherein a distance between adjacent optical communication modules of the plurality of optical communication modules is based on a difference between the first height and a third height from wiring substrate to the optical fiber cable.

2. The optical-electrical hybrid module according to claim 1, wherein the first height is determined according to a thickness of a part having a greatest thickness among parts mounted on the wiring substrates of the plurality of optical communication modules, and the second height is determined according to a thickness of a part having a smallest thickness among the parts mounted on the wiring substrates of the plurality of optical communication modules.

3. The optical-electrical hybrid module according to claim 2, wherein the part having the greatest thickness among the parts mounted on the wiring substrates of the plurality of optical communication modules is a silicon interposer.

4. The optical-electrical hybrid module according to claim 1, wherein, the second horizontal surface extends by about 2 mm to about 15 mm long in a direction in which the optical fiber cable extends.

5. The optical-electrical hybrid module according to claim 1, wherein a difference between the first height and the second height is about 0.2 mm or more.

6. The optical-electrical hybrid module according to claim 1, wherein the shield case is formed of a metal material.

7. The optical-electrical hybrid module according to claim 1, wherein the inclined surface is located between the first horizontal surface and the second horizontal surface.

8. The optical-electrical hybrid module according to claim 1, wherein the inclined surface is inclined from the first height to the second height.

9. The optical-electrical hybrid module according to claim 1, wherein the first height is larger than the second height.

10. The optical-electrical hybrid module according to claim 1, wherein the first height is about 0.2 mm to about 0.8 mm.

11. The optical-electrical hybrid module according to claim 1, wherein the second height is about 0.2 mm to about 0.6 mm.

12. The optical-electrical hybrid module according to claim 1, wherein sum of the length of the second horizontal surface and the length of the inclined surface is about 6.2 mm or more.

13. The optical-electrical hybrid module according to claim 12, wherein the distance between the adjacent optical communication modules of the plurality of optical communication modules is about 0 mm.

14. A shield case for covering an optical communication module, the shield case comprising:
  a first horizontal surface having a first height from a wiring substrate of the optical communication module, wherein the first height is determined according to a thickness of a part having a greatest thickness among parts mounted on wiring substrate of the optical communication module;
  a second horizontal surface having a second height from the wiring substrate, wherein the second height is different from the first height; and
  an inclined surface inclined in a direction away from a position in which an optical fiber cable is mounted to the optical communication module,
  wherein the first horizontal surface is configured to cover an optical element mounted on the wiring substrate.

15. The shield case according to claim 14, wherein the first height is larger than the second height.

16. The shield case according to claim 14, wherein the optical communication module transmits or receives an optical signal through the optical fiber cable and performs conversion between the optical signal and an electrical signal.

17. The shield case according to claim 14, wherein the second height is determined according to a thickness of a part having a smallest thickness among the parts mounted on the wiring substrate of the optical communication module.

18. The shield case according to claim 14, wherein a difference between the first height and the second height is about 0.2 mm or more.

19. The shield case according to claim 14, wherein the inclined surface is inclined from the first height to the second height.

20. The shield case according to claim 14, wherein the shield case is formed of a metal material.

21. An optical-electrical hybrid module comprising:
  a substrate on which a plurality of optical communication modules are arranged, the plurality of optical communication modules transmitting or receiving an optical signal through an optical fiber cable and performing conversion between the optical signal and an electrical signal; and
  a shield case covering each of the plurality of optical communication modules, wherein a top surface of the shield case comprises:
    a first horizontal surface having a first height from wiring substrates of the plurality of optical communication modules;
    a second horizontal surface having a second height from the wiring substrates of the plurality of optical communication modules, wherein the second height is different from the first height; and
    an inclined surface inclined in a direction away from a position in which the optical fiber cable is mounted to each optical communication module,
  wherein a sum of the length of the second horizontal surface and the length of the inclined surface is about 6.2 mm or more.

* * * * *